United States Patent [19]

Boczar

[11] Patent Number: 5,339,189
[45] Date of Patent: Aug. 16, 1994

[54] NONLINEAR FREQUENCY CONVERSION OPTICAL FILTER

[75] Inventor: Bruce P. Boczar, Trevose, Pa.

[73] Assignee: The United States of America as represented by the Secretary of the Navy, Washington, D.C.

[21] Appl. No.: 123,959

[22] Filed: Sep. 20, 1993

[51] Int. Cl.$^5$ .................................................. G02F 1/39
[52] U.S. Cl. .................................................. 359/326
[58] Field of Search ................................ 359/326–332

[56] References Cited

U.S. PATENT DOCUMENTS

| | | | |
|---|---|---|---|
| 4,633,103 | 12/1986 | Hyman et al. | 359/327 |
| 4,958,910 | 9/1990 | Taylor et al. | 359/327 |
| 5,007,717 | 4/1991 | Cutolo et al. | 359/328 |
| 5,060,085 | 10/1991 | Gelbwachs | 359/326 X |

*Primary Examiner*—John D. Lee
*Attorney, Agent, or Firm*—James V. Tura; James B. Bechtel; Susan E. Verona

[57] ABSTRACT

The present invention is a method and system for performing optical filtering. Light energy in one frequency band is received in this system. The received light energy is filtered in one frequency band in order to provide filtered light which is applied to a nonlinear optical device. The nonlinear optical device provides frequency conversion preferably by forming a sum frequency or difference frequency. The frequency converted light energy is in a second frequency band. The energy in this second frequency band is applied to a further filter in a different frequency band wherein the two filter frequency bands are selected to prevent light energy from passing through both filters. The received light energy may contain information which is recoverable from the light energy which passes through the second filter. The nonlinear device is a crystal in which the index of refraction may be changed in order to tune the filter.

23 Claims, 2 Drawing Sheets

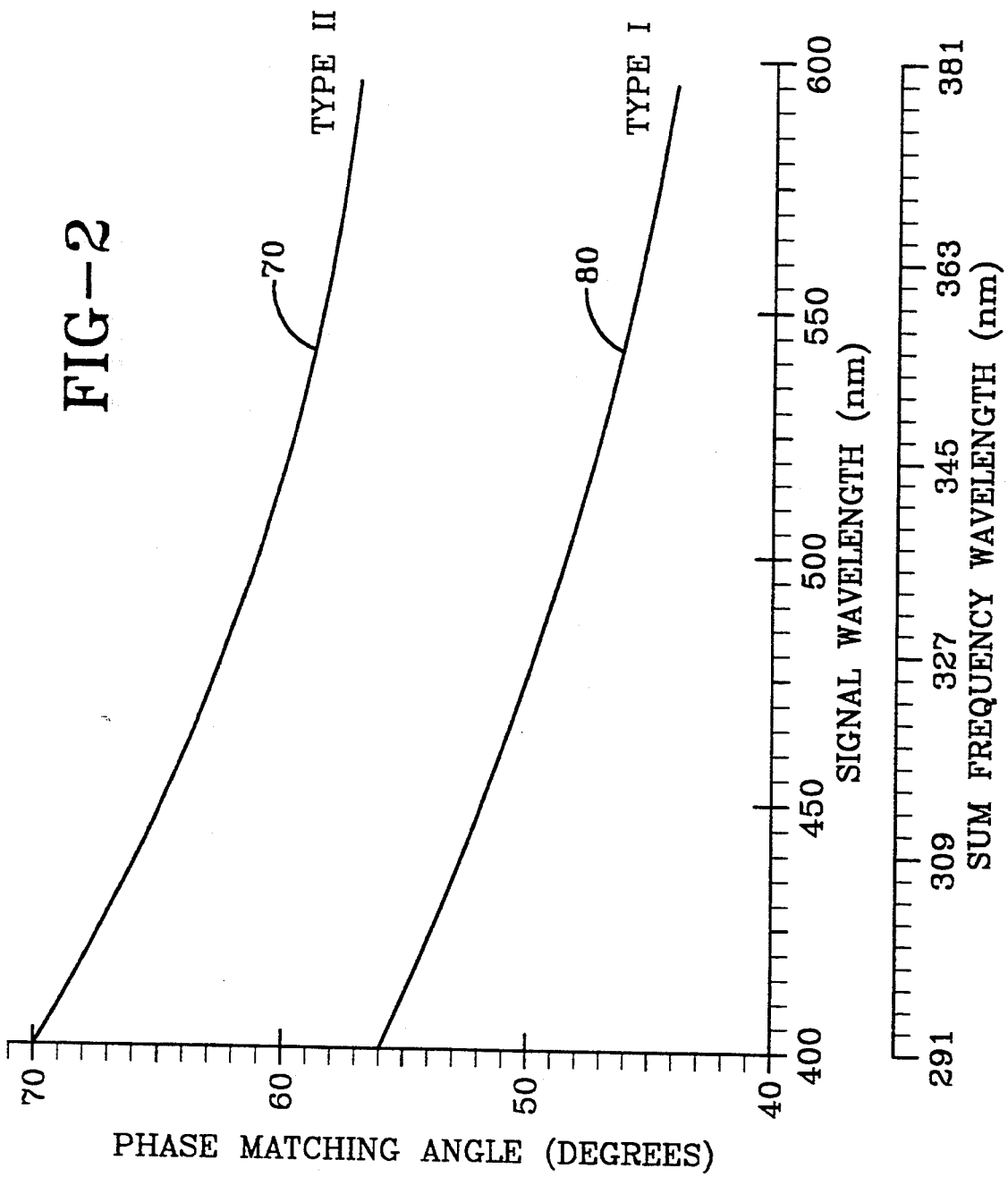

«5,339,189»

NONLINEAR FREQUENCY CONVERSION OPTICAL FILTER

The invention described herein may be manufactured and used by or for the government of the United States of America for governmental purposes without the payment of any royalties thereon or therefore.

BACKGROUND OF THE INVENTION

The present invention relates to optical filters and, more particularly, to laser radar optical filters using frequency conversion.

Many optical filters used for laser radar are available in the prior art. As understood by those skilled in the art each of these known optical filters has its drawbacks. Some examples of prior art optical filters known in the art include atomic line filters, Faraday anomalous dispersion optical filters, Lyott filters and interference filters.

Atomic line optical filters and Faraday anomalous dispersion optical filters may be treated together because they are based upon quantum effects in gases. The atomic line optical filters are based on absorption effects in various atomic gases. The Faraday anomalous dispersion optical filters are based on dispersion effects in various atomic gases which are subjected to magnetic fields. It is well known in the prior art that cesium is a commonly used gas for both of these types of optical filters.

Unfortunately, these two types of optical filters are not tunable over a broad range of filter frequencies in the manner required for many applications. Additionally, it may be difficult to provide the gaseous cells required for these filters. Furthermore, because these optical filters involve transitions and resonances of atoms within gases, they impose stringent constraints on the corresponding laser transmitters which are used with them.

Lyott filters, which are based on birefringent effects, have their own difficulties. These filters are plagued by materials problems and a limited field of view. However, they do have better tunability than the atomic line filters and the Faraday filters. The other type of optical filters known in the art, interference filters, have a wide bandwidth. Thus they have a lower signal-to-noise ratio and poor transmission which limits efficiency.

The present invention comprises a method and system for overcoming these constraints wherein a wide bandwidth permits relaxation of the constraints on the transmitting system while still permitting a high signal-to-noise ratio and a good field of view. In this system two linear filters are selected to prevent light from passing through both of them. Between the two filters a nonlinear optical device such as a crystal is provided in order to provide sum or difference frequencies which are based upon an input signal which may contain information. The sum or difference frequencies contain the information of the original input signal but are in a different frequency band. This permits the passing of information through the second linear filter which blocks the remainder of the light energy carrying the noise.

SUMMARY OF THE INVENTION

The present invention is a method and system for performing optical filtering. Light energy in one frequency band is received in this system. The received light energy is filtered in one frequency band in order to provide filtered light which is applied to a nonlinear optical device. The nonlinear optical device provides frequency conversion preferably by forming a sum frequency or difference frequency. The frequency converted light energy is in a second frequency band. The energy in this second frequency band is applied to a further filter in a different frequency band wherein the two filter frequency bands are selected to prevent light energy from passing through both filters. The received light energy may contain information which is recoverable from the light energy which passes through the second filter. The nonlinear device is a crystal in which the index of refraction may be changed in order to tune the filter.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, there is shown in the drawings embodiments which are presently preferred. It should be understood, however, that the invention is not limited to the precise arrangements and instrumentalities shown. In the drawings:

FIG. 2 is a graphical representation of the dispersion curves indicating the required phase matching angle of the nonlinear crystal of the optical filter system of FIG. 1.

DETAILED DESCRIPTION OF THE PREFERRED EMBODIMENTS

Figure 1:
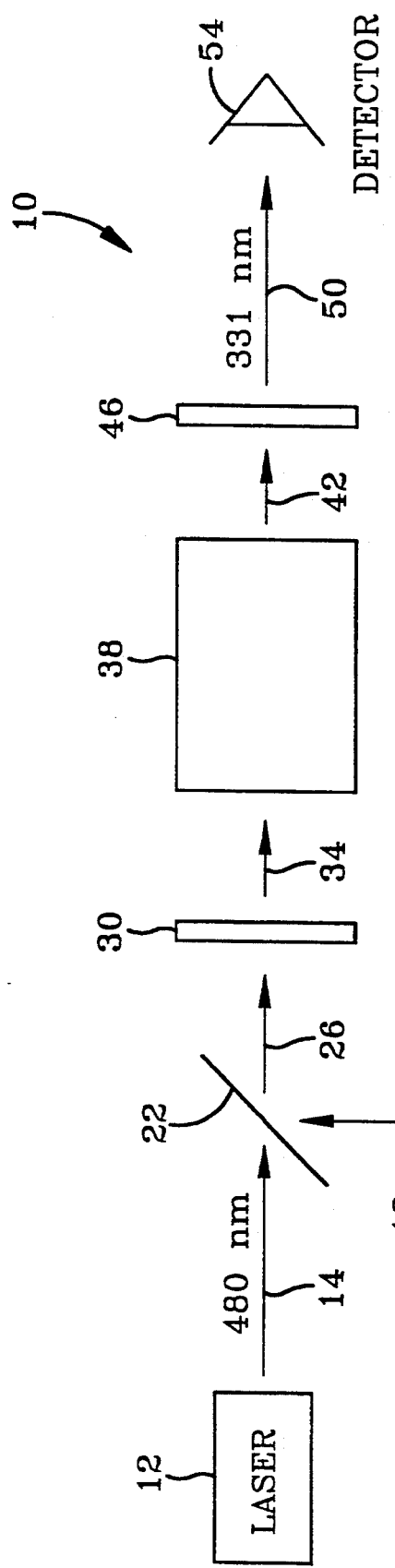
FIG. 1 is a block diagram representation of the nonlinear frequency conversion optical filter system of the present invention.

Referring to the drawings, wherein the same reference numerals are used to designate the same elements throughout, there is shown in FIG. 1 a block diagram representation of nonlinear frequency conversion optical filter system 10 of the present invention. Nonlinear frequency conversion optical filter system 10 shifts the signal wavelength of interest from an input wavelength region to a shifted wavelength region. In the shifted wavelength region unwanted background signals present in the original signal band can be easily eliminated. The signal of interest may therefore be more easily detected using nonlinear frequency conversion of optical filter system 10.

Within optical filter system 10 visible input wavelength signal 14 is generated by frequency tripled Nd:YAG pumped optical parametric oscillator 12. Input wavelength signal 14 is made collinear with a signal such as residual radiation signal 18 using dichroic beamsplitter 22. This process forms wavelength signal 26 which includes both collinear signals 14, 18. It will be understood that wavelength signal 14 may be, for example, an information signal from a laser radar at a location remote from optical filter system 10 or backscatter from a radar signal originally transmitted from the vicinity of optical filter system 10.

Wavelength signal 26 from dichroic beamsplitter 22 is applied to nonlinear crystal 38. In the preferred embodiment of optical filter system 10 nonlinear crystal 38 may be formed of KD*P. Also in the preferred embodiment of optical filter system 10 color glass optical filter 30 is applied to wavelength signal 26 prior to applying wavelength signal 26 to nonlinear crystal 38. Color glass filter 30 may be, for example, Schott GG400. Alternately, filter 30 may be formed of a liquid or gas having suitable properties as described herein if preferred. In the preferred embodiment of optical filter system 10 wavelength signal 26 is transmitted through color glass filter 30 in this manner as part of a process adapted to eliminate unwanted ultraviolet solar background from wavelength signal 26.

The phase matching angle of nonlinear crystal 38 of optical filter system 10 is selected to generate a sum frequency of collinear signals 14, 18. For example, if the wavelength of input signal 14 is 480 nm and the wavelength of input signal 18 is 1064 nm, the phase matching angle of nonlinear crystal 38 may be selected to generate 331 nm. It will be understood by those skilled in the art that this sum signal may be determined as $1/480 + 1/1064 = 1/331$. Resulting wavelength signal 42, including the 331 nm, 480 nm and 1064 nm wavelength components, is then transmitted from nonlinear crystal 38.

Color glass optical filter 46 then passes wavelength signal 42 which is transmitted from nonlinear crystal 38. Color glass optical filter 46 may be, for example, Schott UG1. Filter 46 may also be a liquid or a gas having suitable properties if preferred. Color glass optical filter 46 is selected to reject visible wavelengths that are not upconverted within nonlinear crystal 38. Optical filter 46 does not pass the 480 nm signal or the 1064 nm signal which are also transmitted by nonlinear crystal 38.

It should be understood that, while optical filter 46 passes the 331 nm signal from nonlinear crystal 38 to provide output wavelength signal 50, optical filter 30 does not pass a 331 nm signal. Furthermore, optical filters 30, 46 are preferably selected such that any light which passes through one of them does not pass through the other. The light passed by one filter 30, 46 but blocked by the other filter 30, 46 includes ultraviolet light and infrared light. In this manner any wavelengths which add noise within wavelength signal 26 are blocked by either optical filter 30 or optical filter 46 within nonlinear frequency conversion optical filter system 10. For example, the sunlight which may swamp out laser radar signals is not passed by the combination of optical filters 30, 46.

It will be understood by those skilled in the art that the 331 nm signal is only present at the output of nonlinear crystal 38 as long as both the 480 nm signal and the 1,064 nm signal are applied to the input of nonlinear crystal 38. Both signals must be present for the sum frequency to be present at the output of nonlinear crystal 38. Thus it is possible to use, for example, a 1,064 nm signal to gate signal 50 which is applied to detector 54. Using this method it is possible to divide backscatter signals into bins in order to separate information with respect to closer objects from information with respect to farther objects.

Referring now to FIG. 2, there are shown dispersion curves 70, 80. Dispersion curves 70, 80 are graphical representations indicating the required phase matching angles of nonlinear crystal 38 within nonlinear frequency conversion optical filter system 10 of the present invention for the above example. It will be recalled that in the above example the wavelength of input wavelength signal 14 is selected to be in the vicinity of 480 mm. Dispersion curves 70, 80 illustrate the phase matching angle of nonlinear crystal 38 as a function of the wavelength of input signal 14 in the vicinity of 480 nm assuming that the wavelength of input wavelength signal 18 is 1064 nm.

As understood by those skilled in the art, the frequency summing represented by dispersion curves 70, 80 results from the nonlinear physical properties of crystal 38. Nonlinear crystal 38 is a birefringent crystal wherein the index of refraction depends on the type of input ray. Input rays may either be of the O type for ordinary rays or of the E type for extraordinary rays. This gives use to three types of cases: type I, type II and type III.

Type I cases are cases in which the two input polarizations are the same and the output is orthogonal. In this case both the 480 nm and the 1,064 nm are O rays and the 331 nm is an E ray. This corresponds to dispersion curve 80.

Type II cases are cases in which the two input rays are orthogonal and the output ray is the same polarization as the lowest frequency input. For example, the 1,064 nm ray would be an E ray, the 480 nm ray would be an O ray and the 331 nm ray would be an E ray. Type III cases are cases in which the two input rays are orthogonal and the output ray is the same polarization as the highest frequency input.

Nonlinear crystal 38 may be physically rotated in order to adjust the phase matching angle of optical filter system 10. In one preferred embodiment of nonlinear frequency conversion optical filter system 10, the tuning of optical filter system 10 is performed by changing the phase matching angle of nonlinear crystal 38 in a manner well known to those skilled in the art. In another preferred embodiment of optical filter system 10 the wavelength of input wavelength signal 14 may be tuned by changing optical parametric oscillator 12.

In practice the easiest way to tune the nonlinear upconverter is by merely physically rotating the crystal. However, it will be understood by those skilled in the art that the phase matching angle may be changed using temperature changes or electric fields applied to the crystal. It will also be understood that quasi-phase matching techniques may be used in filter system 10. Additionally, the method of the present invention may be practiced with no phase matching at all, although this results in very inefficient production of 331 nm energy.

KD*P crystal works best with pulse sources like lasers wherein the pulses are on the order of $10^{-9}$ seconds. This partly explains why this system is so good at blocking out sunlight. Sunlight, of course, is not pulsed at all. The efficiency of the nonlinear process scales with the peak intensity of the pulses.

Nonlinear frequency conversion optical filter system 10 provides several advantages over prior art filter technologies. Optical filter system 10 may be formed as an all solid state device, although nonlinear crystal 38 may be formed of a gas or a liquid having nonlinear transmission properties if preferred. Forming optical filter system 10 as an all solid state device eliminates the need for the gaseous cell of many of the prior art optical filter systems such as the atomic line optical filters and the Faraday anomalous dispersion optical filters. Additionally, nonlinear frequency conversion optical filter system 10 is continuously tunable over a broad wavelength range because it can be tuned by changing the phase matching angle of nonlinear crystal 38.

The bandwidth requirements of transmitter 12 are greatly relaxed because of the larger bandwidth throughput of optical filter system 10. However, optical filter system 10 does not suffer from a corresponding signal-to-noise problem because it responds to peak power. For example, because sunlight is cw it does not get converted even though it is in the input bandwidth of optical filter system 10. Furthermore, optical filter system 10 can be matched to existing fixed or variable wavelength transmitters known to those skilled in the art.

Optical filter system 10 has good solar background rejection as previously described. The good solar background rejection of optical filter 10 is due to the fact that sunlight is essentially cw in nature and is therefore not effectively frequency shifted in the nonlinear material of nonlinear crystal 38. Thus sunlight is effectively excluded from wavelength signal 42 in optical filter system 10 because it is not upconverted to a frequency region passed by optical filter 46.

Nonlinear frequency conversion optical filter system 10 may use sum frequency generation, difference frequency generation, or second harmonic generation. In the case of sum or difference frequency mixing, wavelength signal 18 having a third frequency may be provided by an additional laser at a receiver site. For example, this third frequency may be residual 1064 mm. Alternately, the third frequency may be co-transmitted with input wavelength signal 14 by optical parameters oscillator 12 or transmitter laser 12.

In an experimental demonstration of frequency conversion optical filter system 10, KD*P was used as the nonlinear material of nonlinear crystal 38 as previously described. However, it will be understood by those skilled in the art that other nonlinear materials could be used in forming nonlinear crystal 38. For example, nonlinear crystal 38 may be formed of BBO, LBO and various liquids and gases known to those skilled in the art. A polarizer may be used within optical filter system 10 in place of dichroic beamsplitter 22 in type II or type III cases. Additionally, any other device able to provide two collinear signals for mixing within nonlinear crystal 38 may be used.

Additionally, it will be understood by those skilled in the art that other spectral regions may be accessed using the method of nonlinear frequency conversion system 10 in addition to the ones described herein. Likewise, in the experimental demonstrations described hereinabove a frequency tripled Nd:YAG pumped optical parametric oscillator was used as transmitter laser 12, as also previously described. However, it will be understood by those skilled in the art that other laser transmitters known to those skilled in the art may be used to provide input wavelength signal 14 or wavelength signal 18.

Nonlinear frequency conversion optical filter system 10 may be used in the receiver portion of a laser communications system, a lidar system, or a laser radar system. Because optical filter system 10 eliminates solar background radiation it is effective to improve the signal-to-noise ratio of these types of communication systems and laser radar. In addition, unwanted laser signals may also be filtered by optical filter system 10 in order to prevent potential jamming of these communication systems.

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention as defined by the appended claims.

I claim:

1. A method for performing optical filtering in an optical filter system, comprising the steps of:
    (a) receiving light energy in a first frequency band, said light energy composed of two different frequencies;
    (b) first filtering said received light energy with a first filter in said first frequency band to provide first filtered light energy;
    (c) applying said first filtered light energy to a nonlinear optical device to provide frequency converted light energy in a second frequency band having a value selected from the group comprising the sum and the difference of said two different frequencies; and
    (d) second filtering said frequency converted light energy in said second frequency band, wherein said first and second frequency bands are selected to prevent the same light energy from passing through both said first and second filtering.

2. The optical filtering method of claim 1, wherein said received light contains information, the method further comprising the further step of recovering said information.

3. The optical filtering method of claim 1, wherein said nonlinear optical device is a crystal.

4. The optical filtering method of claim 3, wherein said crystal is KD*P.

5. The optical filtering method of claim 1, wherein said nonlinear optical device is formed of a gas.

6. The optical filtering method of claim 1, wherein said nonlinear optical device is formed of a liquid.

7. The optical filtering method of claim 1, including the step of providing first and second optical filters to perform said first and second filtering, wherein at least one of said first and second optical filters is formed of color glass.

8. The optical filtering method of claim 7, wherein at least one of said first and second optical filters is formed of gas.

9. The optical filtering method of claim 7, wherein at least one of said first and second optical filters is formed o a liquid.

10. The optical filtering method of claim 1, including the step of providing first and second optical filters to perform said first and second filtering, wherein at least one of said first and second optical filters comprises an interference filter.

11. The optical filtering method of claim 1, comprising the further step of tuning said optical filter system.

12. The optical filtering method of claim 11, wherein the step of tuning said optical filter system comprises rotating an axis of said nonlinear optical device with respect to said received light energy.

13. The optical filtering method of claim 11, wherein the step of tuning said optical filter system comprises applying thermal energy to said nonlinear optical device.

14. The optical filtering method of claim 11, wherein the step of tuning said optical filter system comprises the step of applying an electromagnetic field to said nonlinear optical device.

15. The optical filtering method of claim 1, wherein the step of providing said frequency converted light energy comprises selecting said sum of said two different frequencies.

16. The optical filtering method of claim 1, wherein the step of providing said frequency converted light energy comprises selecting said difference of said two different frequencies.

17. A system for performing optical filtering comprising:
- a first filter for receiving light energy composed of two different frequencies and first filtering said received light energy in a first frequency band to provide first filtered light energy;
- a nonlinear optical device for receiving said first filtered light energy to provide frequency converted light energy in a second frequency band having a value selected from the group comprising the sum and the difference of said two different frequencies; and
- a second filter for filtering said frequency converted light energy in said second frequency band, wherein said first and second frequency bands are selected to prevent the same light energy from passing through both said first and second filters.

18. The optical filtering system of claim 17, wherein said received light contains information and wherein said system further comprises means for recovering said information.

19. The optical filtering system of claim 17, wherein said nonlinear optical device is a crystal.

20. The optical filtering system of claim 17, wherein at least one of said first and second optical filters is formed of color glass.

21. The optical filtering system of claim 20, wherein said nonlinear optical device comprises an axis for rotating said nonlinear optical device around said axis with respect to said received light energy in order to tune said optical filtering system.

22. The optical filtering system of claim 17, wherein said nonlinear optical device comprises means for providing said sum of said two different frequencies.

23. The optical filtering system of claim 17, wherein said nonlinear optical device comprises means for providing said difference of said two different frequencies.

* * * * *